United States Patent [19]
Chlebowski

[11] 3,869,027
[45] Mar. 4, 1975

[54] DRUM BRAKE ASSEMBLY
[75] Inventor: Richard A. Chlebowski, South Bend, Ind.
[73] Assignee: The Bendix Corporation, South Bend, Ind.
[22] Filed: Oct. 24, 1973
[21] Appl. No.: 409,347

[52] U.S. Cl................................. 188/340, 188/331
[51] Int. Cl............................................. F16d 51/14
[58] Field of Search ........... 188/340, 331, 332, 333, 188/, 334, 335, 78, 325, 216

[56] References Cited
UNITED STATES PATENTS

| | | | |
|---|---|---|---|
| 2,578,285 | 12/1951 | Butterfield | 188/78 |
| 2,989,150 | 6/1961 | Compton | 188/340 |
| 3,106,991 | 10/1963 | Winge | 188/332 |
| 3,118,518 | 1/1964 | Swift | 188/340 |
| 3,186,519 | 6/1965 | Johannesen | 188/340 |
| 3,795,292 | 3/1974 | Keller, Jr. | 188/340 |

*Primary Examiner*—Trygve M. Blix
*Assistant Examiner*—Edward R. Kazenske
*Attorney, Agent, or Firm*—Ken C. Decker; William N. Antonis

[57] ABSTRACT

A drum brake assembly including two shoes arranged in end to end relationship and a torque spider having a plurality of diametrically extending guide pads or ledges spaced apart circumferentially and axially of the spider so that the axially spaced pads are in facing relationship to slidably receive a shoe web between the faces of the ledges for radial movement of the shoes into frictional engagement with a rotating drum. Two leaf springs are prestressed respectively between each shoe web and the face of one of the associated ledges to urge the web against the face of another of the axially disposed ledges to thereby maintain the shoes centrally positioned with respect to the drum and out of contact with the drum during brake release and additionally to suppress brake noise.

5 Claims, 3 Drawing Figures

PATENTED MAR 4 1975  3,869,027

DRUM BRAKE ASSEMBLY

BACKGROUND OF THE INVENTION

The invention relates to drum brakes and, more particularly, to brakes for recreational vehicles such as, for example, golf carts and towed vehicles such as, for example, house trailers.

In truck and semi-trailer vehicles requiring heavy duty brakes, it has been the practice to incorporate a central supporting structure known in the brake art as a torque spider or support plate mounted to a fixed part of the vehicle, such as an axle flange. The spider is formed with supporting ledges for receiving brake shoes slidably carried on the spider for actuation into frictional engagement with a rotating drum to which one of the vehicle wheels is drivably connected. Such a construction is disclosed in U.S. Pat. No. 3,362,506, and in U.S. Application Ser. No. 331,912, filed Feb. 12, 1973, now U.S. Pat. No. 3,795,292 both assigned to the common assignee of the present invention. Since the brake of the invention herein disclosed is primarily for vehicles relatively light in weight when compared with semi-trailers, etc., the torque spider and the shoe hold-down spring means of the heavy duty brakes shown in the above-referenced patent and patent application have been found too bulky and costly for use on light weight vehicles. Accordingly, the present invention is proposed to resolve these problems through modification of the spider and hold-down spring.

SUMMARY OF THE INVENTION

An important object of my invention is to provide a leaf spring shoe hold-down device to be inserted into a drum brake assembly between a brake shoe web and a supporting ledge integral with the torque spider to control undesirable shifting of the brake shoe.

An important object of the invention is to provide, in a drum brake assembly of the type wherein a torque spider member is equipped with a plurality of diametrically disposed and axially displaced supporting ledges in facing relationship to slidably receive a shoe web between the facing ledges, a novel one-piece leaf type shoe hold-down spring insertable between the shoe web and one supporting ledge so that the shoe web is urged against the face of an oppositely facing ledge.

Another important object of the invention is to provide, in a drum brake assembly of the type wherein a spider member is formed with diametrically arranged and axially displaced supporting ledges in facing relationship to slidably receive a shoe web, a novel one-piece spring steel brake shoe hold-down device having a flat body portion abutting one of the ledges and laterally projecting arms prestressed into abutting relationship with the shoe web so that the shoe web is urged against the face of an oppositely facing ledge.

A still further object of the invention is to provide a one-piece brake shoe hold-down spring which is economical to manufacture and replaceable in the field.

DETAILED DESCRIPTION

Figure 1:
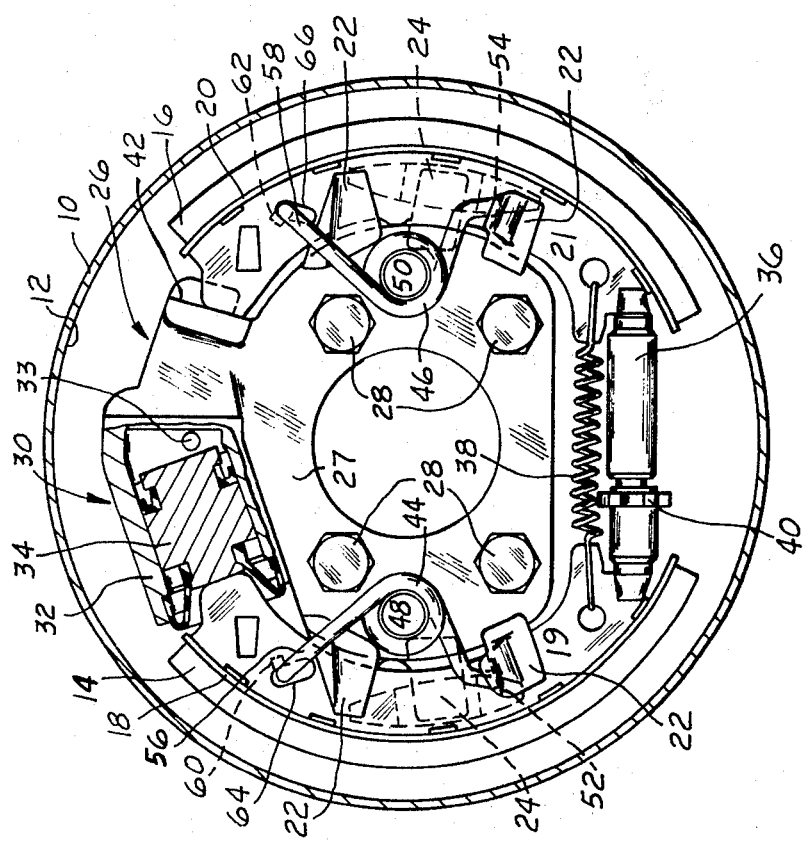
FIG. 1 is a view in vertical section of a brake assembly taken just inside the brake drum head so as to illustrate the arrangement of the parts as seen from the outboard side of the brake, and embodying the principles of my invention.

Referring now to the drawings, FIG. 1 shows a brake assembly including a drum 10 mounted on a vehicle wheel, not shown. The drum is formed with an internal surface 12 to be frictionally engaged by friction linings 14 and 16 attached respectively to brake shoes 18 and 20. The brake shoes 18 and 20 have their respective webs 19 and 21 slidably carried between a plurality of oppositely facing ledges or guide pads 22 and 24, spaced apart axially on the outer periphery of a support member or torque spider 26. The oppositely facing guide pads 22 and 24 appearing on one side only of the brake assembly together form a set of guide pads. There are two such sets, one set for each shoe, diametrically located at the outer periphery of the spider. The spider 26 has an inner flange portion 27 through which a plurality of circumferentially spaced bolts 28 project for securing the spider to a vehicle axle flange, not shown. An actuator 30 is provided with a housing 32 formed integrally with the spider casting 26. A threaded opening 33 in the housing 32 is adapted to be connected to a vehicle hydraulic braking system. A piston 34 is sealingly and slidingly retained within the housing 32, with the outer end of the piston in driving engagement with one end of the shoe 18. The other end of the shoe 18 is linked to the shoe 20 by an adjusting screw 36 and a spring 38, the latter of which holds the lower ends of the shoes 18 and 20 in driving engagement and also prevents rotation of star wheel 40, except when it is desired to make a brake shoe adjustment manually. Any of the commercially well-known shoe adjusting devices may be used and since the adjuster forms no part of the invention per se, no further description is believed necessary. The upper end of the shoe 20 is anchored on an abutment 42 formed circumferentially in the spider with respect to the actuator 30, so that with the brake shoes in brake released position the shoe rims form an imaginary ring about the central axis of the brake concentric with the drum. Shoe return springs 44 and 46 are connected respectively to the shoes 18 and 20 so that the brake shoes are returned to the positions shown in FIG. 1 upon brake release. The springs 44 and 46 are coil torsion springs located on posts 48 and 50 respectively, the latter of which are integral with the spider. One end of each of the coils 44 and 46 is in fixed engagement respectively with abutments 52 and 54 located in one of the guide pads 22 to absorb the reactive force developed upon rotation of free ends 56 and 58 of the springs 44 and 46. The free ends 56 and 58 of the springs are hooked under or drivably attached respectively to the webs 19 and 21 of shoes 18 and 20. The freely flexible ends 56 and 58 are formed with fingers 60 and 62 which pass through slots 64 and 66 in the webs 19 and 21 to thereby securely fasten the return springs to their associated shoes.

The above description of the brake assembly of FIG. 1 is for a left vehicle wheel. The assembly relates to a so-called Uni-Servo type of brake, well known in the brake art. Such a brake permits the shoe to rotate about a single anchor or abutment 42 upon brake application during forward movement of the vehicle, as indicated by the arrow. As noted, the bottom ends of the shoes are linked or coupled together by the adjusting screw 36 and the spring 38. The particular type brake shown is by way of example only, and it is understood that other types of brakes may be used without departing from the spirit of the invention as long as the basic construction of the spider member and the shoe hold-down springs are retained. The brake assembly will now be described with respect to the improvement thereof which distinguishes it from prior art brakes.

Figure 2:
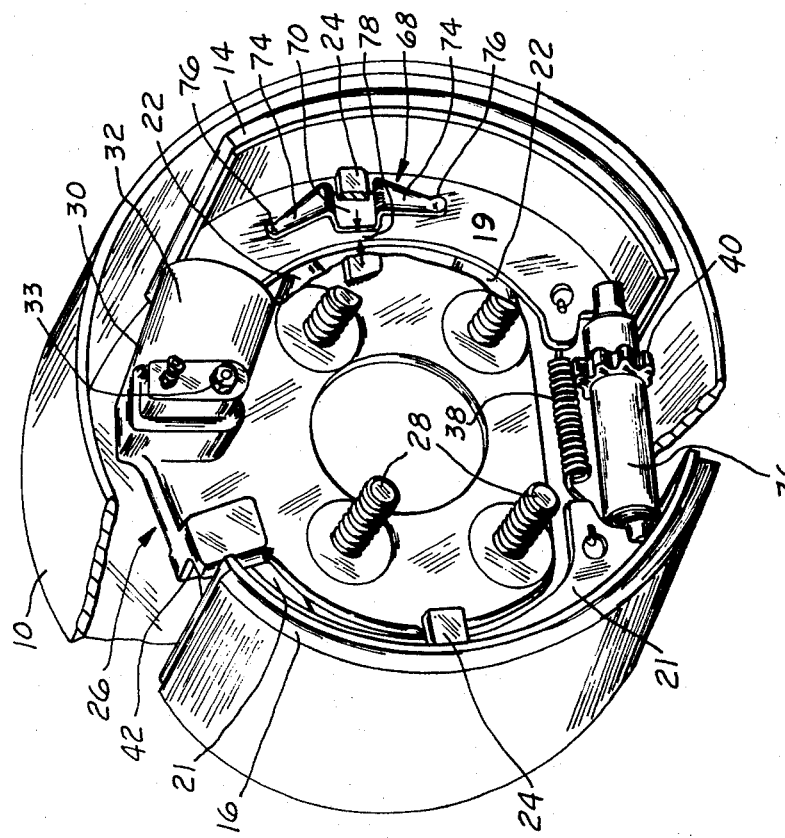
FIG. 2 is a perspective view of the brake assembly of FIG. 1, as seen from the inboard side of the brake assembly, with portions broken away to show the location of the hold-down springs.
Figure 3:
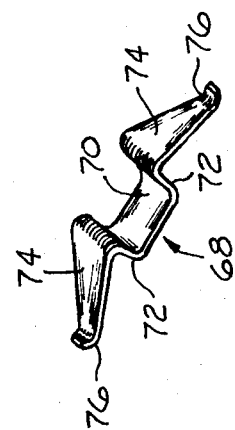
FIG. 3 is a generally perspective view of a brake shoe hold-down spring according to the principles of the invention.

With reference to FIGS. 2 and 3, shoe hold-down springs 68 are inserted between the ledges or guide pads 24 and the webs of the associated brake shoes 18 and 20 to prevent undesirable sliding of the shoes into the drums during brake release, which not only produces unacceptable lining wear but an intolerable noise condition. The spring 68 is constructed with a substantially flat central body portion 70 having spaced-apart parallel side walls 72, extending along the sides of the guide pad 24 to lock-in the spring 68, so that it cannot shift circumferentially with the shoes. Arms 74 integral with the side walls 72 are freely and flexibly supported from the central body portion 70, with the outer or free ends 76 of the arms prestressed when assembled, so that the shoe web is urged against the ledges or pads 22. It will be observed that the central body portion 70 abuts the underside of the guide pad or ledge 24, leaving a space 78 between the central body portion 70 and the associated shoe web 19, as best shown in FIG. 2. Also similar spacing 78 appears between the associated shoe web 21 and the central body portion 70 of the spring 68 located on the left side of FIG. 2, not shown. Note this spring is in dotted outline on the right of FIG. 1. The free ends 76 of the two springs 68 have line area contact with the shoe webs 19 and 21 respectively. This line area contact, as determined by the preload on the arms 74 of the spring when stressed, illustrated in FIG. 2, may be regulated to obtain the required resistance to shoe movement on the pads or ledges 22.

MODE OF OPERATION

Referencing FIG. 1, assuming a hold-down spring 68 is to be incorporated into the brake assembly on a vehicle in the field to control the sliding action of the brake shoe 19 during brake release. The wheel, not shown, and drum are first removed, to expose the brake assembly including the shoe 19 which is mounted on the left side with respect to FIG. 1. The bottom end of the torsion spring 44 is disengaged from the abutment 52, permitting removal of the spring from the brake assembly. This permits rotating the shoe 19 to the left, as viewed in FIG. 1, so as to expose the ledge 24 for the insertion of the spring 68 so that the central body portion 70 overlies the pad 24. The brake shoe 19 is then repositioned as illustrated in FIG. 1, and the torsion spring 44 reassembled to the brake. The same general procedure is applied to insert a hold-down spring with the shoe 21.

During forward motion of the vehicle, the drum 10, referencing FIG. 1, will rotate in the direction of the arrow. When the brakes are applied, the shoes are brought into contact with the rotating drum. At this time, i.e., during forward motion of the vehicle, the piston 34 acts on the primary shoe 19 tending to rotate it with the drum which forces the secondary shoe 21 into contact with the drum through the link or adjusting screw 36. In the forward direction, braking is more effective due to the so-called "servo action" generated by the primary shoe 19 acting to apply the secondary shoe 21. The secondary shoe anchors against the abutment 42, located at the top side of the brake assembly. However, during reverse motion of the vehicle braking effectiveness is less since the "servo action" is diminished in the reverse motion of the vehicle. This is due to the fact that the shoe 21 is not now being pushed into the drum by the piston with the same effectiveness when braking in reverse, so as to generate servo action, as is the case for forward braking. The hold-down springs 68, associated with the respective brake shoes 18 and 20, are preloaded such that the shoes are not unduly inhibited from movement into and out of engagement with the drum when the brakes are applied. The hold-down spring preload is controlled by spring design to provide the desired effect during braking and non-braking conditions. Moreover, during brake release, the preload of the hold-down springs is such as to resist sliding of the shoes due to weakened or unstressed return springs 44 and 46 or rough roads or a combination of these things.

I claim:

1. In a drum brake assembly having a torque spider provided with a plurality of axially spaced-apart oppositely facing guide pads at the outer periphery thereof for slidably receiving a shoe web of an associated brake shoe between the guide pads and an actuator for moving the shoe into engagement with the drum, the improvement for maintaining the shoe from undesirable sliding into the drum during brake release, said improvement comprising:
   a brake shoe hold-down device supported and prestressed between one of the oppositely facing axially spaced-apart guide pads and the shoe web, urging the web against another of the guide pads to thereby preload the web between the guide pads to inhibit shifting of the shoe;
   said hold-down device being a leaf spring having a central body portion carried on said one guide pad and laterally projecting arms having free ends prestressed against the web.

2. The improvement in claim 1 wherein said central body portion is formed with parallel extending side walls with which the laterally projecting arms are integral, the side walls being spaced apart to receive said one guide pad therebetween, to thereby lock-in the leaf spring to prevent circumferential shifting.

3. The improvement in claim 2 wherein the laterally projecting arms are of cantiliver construction and flexibly carried by the side walls with the free ends of the arms formed so that there is line contact between the ends and the web.

4. In a drum brake assembly comprising:
   a pair of brake shoes engageable with a rotatable brade drum;
   a torque spider adapted to be secured to a fixed part of a vehicle, said spider having two sets of a plurality of axially spaced-apart guide pads located diametrically of the spider for slidably receiving respectively shoe webs of said pair of brake shoes;
   an acutator mounted on the spider and operatively connected to the brake shoes for urging the shoes into engagement with the drum;
   two return springs carried by the spider and connected respectively to the pair of brake shoes for withdrawing the shoes from drum engagement upon brake release; and a pair of brake shoe hold-down springs, one for each shoe, each hold-down spring having a central body portion, parallel sides integral with the body portion, and resilient arms projecting laterally from and integral with the parallel sides;

said central body portion and parallel sides defining a recess receiving one of the guide pads of a set, to thereby retain the hold-down spring from circumferential movement;

said resilient arms of the hold-down spring being prestressed against its associated brake shoe web to inhibit undesirable shifting of the shoe during brake release.

5. The drum brake assembly of claim 4, wherein the torque spider is a casting having two diametrically located posts formed therein for receiving the return springs; and wherein said two return springs are coil torsion springs encircling respectively said two posts.

* * * * *